United States Patent [19]
Fulks et al.

[11] Patent Number: 5,927,832
[45] Date of Patent: Jul. 27, 1999

[54] BRAKE SYSTEM CONTROL

[75] Inventors: Gary Chris Fulks, Dayton; William Dale Cornwell; William Frank Borchers, both of Beavercreek, all of Ohio

[73] Assignee: General Motors Corporation, Detroit, Mich.

[21] Appl. No.: 08/854,252

[22] Filed: May 9, 1997

[51] Int. Cl.$^6$ ...................................................... B60T 8/42
[52] U.S. Cl. .................................... 303/167; 303/DIG. 4; 303/10; 303/11; 303/116.1
[58] Field of Search .............................. 303/116.1, 116.4, 303/116.3, 1–12, 115.2, 119.1, DIG. 3, DIG. 4, 122.12, 122.13, 122.14, 166, 122.1, 113.5, 167; 188/191 C; 701/71, 76, 87, 83; 417/12, 44.1, 44.11, 46, 45; 318/430, 484, 701

[56] References Cited

U.S. PATENT DOCUMENTS

| | | |
|---|---|---|
| 4,749,239 | 6/1988 | Onogi et al. . |
| 4,800,498 | 1/1989 | Matsui et al. ....................... 303/DIG. 4 |
| 4,828,334 | 5/1989 | Salman . |
| 4,912,641 | 3/1990 | Kuwana et al. . |
| 4,930,845 | 6/1990 | Bleckmann et al. ..................... 303/167 |
| 4,975,852 | 12/1990 | Fennel et al. . |
| 5,150,298 | 9/1992 | Fujioka et al. . |
| 5,154,494 | 10/1992 | Kost et al. .............................. 303/167 |
| 5,188,440 | 2/1993 | Müller et al. .............................. 303/10 |
| 5,207,484 | 5/1993 | Bleckmann et al. ................ 303/DIG. 4 |
| 5,295,737 | 3/1994 | Epple et al. ............................... 303/11 |
| 5,348,380 | 9/1994 | Korasiak et al. ....................... 303/167 |
| 5,545,929 | 8/1996 | Fijioka et al. ........................... 303/167 |
| 5,551,770 | 9/1996 | Hrovat et al. ........................... 303/167 |
| 5,573,314 | 11/1996 | Akita et al. .............................. 303/10 |
| 5,577,812 | 11/1996 | Hirano et al. ........................... 303/166 |
| 5,632,531 | 5/1997 | Batistic et al. .......................... 303/166 |
| 5,646,849 | 7/1997 | Walenty et al. ........................ 303/167 |
| 5,669,678 | 9/1997 | Stumpe et al. .......................... 303/166 |
| 5,683,149 | 11/1997 | Aizawa et al. .......................... 303/166 |
| 5,709,438 | 1/1998 | Isakson et al. .......................... 303/166 |
| 5,711,582 | 1/1998 | Koike .................................... 303/116.4 |
| 5,720,534 | 2/1998 | Stumpe ................................... 303/166 |
| 5,732,378 | 3/1998 | Eckert et al. ............................ 303/167 |
| 5,733,017 | 3/1998 | Nakashima et al. ...................... 303/10 |
| 5,743,598 | 4/1998 | Toda et al. ................................ 303/11 |
| 5,762,407 | 6/1998 | Stacey et al. ........................... 303/166 |
| 5,779,327 | 7/1998 | Nakashima et al. ............... 303/122.12 |
| 5,791,745 | 8/1998 | Sakakibara ............................... 303/11 |

*Primary Examiner*—Douglas C. Butler
*Attorney, Agent, or Firm*—Anthony L. Simon; Robert M. Sigler

[57] ABSTRACT

A brake system control apparatus comprising: a fluid brake system including a master cylinder containing a hydraulic fluid having a hydraulic pressure, a hydraulic pump having an output hydraulically coupled to the master cylinder, a motor coupled to and providing motive force to the hydraulic pump, a current sensing device coupled to the motor and providing an output signal indicative of electric current through the motor; and an electronic controller coupled to the current sensing device comprising a first sampler taking a first sample of the output signal a first time period after a start up of the motor, a second sampler taking a second sample of the output current a second time period after start up of the motor and a divider for determining a ratio of the first and second samples wherein the ratio is indicative of a hydraulic pressure in the master cylinder at the start up of the motor.

8 Claims, 4 Drawing Sheets

5,927,832

BRAKE SYSTEM CONTROL

This invention relates to a brake system control.

BACKGROUND OF THE INVENTION

Many vehicles produced by automotive manufacturers include anti-lock braking control systems (ABS) typically designed to detect and prevent the occurrence of a wheel lock-up condition during commanded braking of the vehicle. The wheel lock-up condition is prevented by cycling or modulation of the hydraulic pressure to the wheel brake(s) in a known manner by, for example, providing a series of releases and applies of the hydraulic brake pressure.

Many ABS systems use solenoid valves that are controllably opened and closed to increase (apply) and decrease (release) the hydraulic brake pressure to the vehicle brakes. In one known method, an apply solenoid is used to control application of brake pressure from a high pressure hydraulic source, such as a fluid pump, to the wheel brakes and a release solenoid is used to control the release of brake pressure from the fluid brakes to a low pressure brake fluid reservoir or accumulator.

In some systems, during the ABS event, the substantially steady state running current or speed of the hydraulic pump motor is monitored to determine master cylinder pressure, which is used as a control input for the ABS system in a known manner. One challenge to this approach is that different pumps and pump motors, even of the same design, have variations from part to part that affect the relationship between pump running current or speed and pressure output from the pump. For example, tolerance variations in wire used to wind the motor coils can affect the impedance of a motor and therefore also affect the relationship between motor current and output load. Similarly, variations in mechanical parts can affect the internal friction of the motor and of the pump and can also affect the relationship between motor current and output load (i.e., hydraulic pressure at the pump outlet).

SUMMARY OF THE PRESENT INVENTION

It is an object of this invention to provide a brake system control according to claim 1.

Advantageously, this invention provides a brake system control that determines master cylinder pressure in the vehicle brake system immediately upon activation of the vehicle ABS system. Advantageously, this invention determines master cylinder pressure without requiring a master cylinder pressure sensor and without requiring the ABS pump motor to reach its substantially steady state running condition.

Advantageously, this invention recognizes that the start up profile of the electric current through the ABS pump motor, which is activated upon first detection of an incipient wheel lock up condition, varies based on the master cylinder pressure to which the pump output is exposed.

Advantageously, this invention recognizes that by measuring electric current through the pump motor at two different points in time during the start-up of the pump motor and before the pump motor has reached a substantially steady state operation, a ratio of the two measurements may be used as an estimation of master cylinder pressure to which the pump is exposed. This approach has been found to both provide an extremely fast means for estimating master cylinder pressure and to eliminate errors in pump output pressure measurement caused by part-to-part variability, including variations in electrical impedance and variations in internal mechanical losses of the pump and motor.

More particularly then, according to a preferred example, this invention provides a brake system control apparatus comprising: a fluid brake system including a master cylinder and containing a hydraulic fluid having a hydraulic pressure, a hydraulic pump having an output hydraulically coupled to the master cylinder, a motor coupled to and providing motive force to the hydraulic pump and a current sensing device coupled to the motor and providing an output signal indicative of an electric current through the motor; and an electronic controller coupled to the current sensing device, including a first sampler receiving a first sample of the output signal a first time period after a start up of the motor, a second sampler receiving a second sample of the output signal a second time period after the start up of the motor and a divider for determining a ratio of the first and second samples wherein the ratio is indicative of the hydraulic pressure in the master cylinder within 0.15 seconds of the start up of the motor.

BRIEF DESCRIPTION OF THE DRAWINGS

The present invention will now be described by way of example with reference to the following drawings in which.

DETAILED DESCRIPTION OF THE INVENTION

Figure 1:
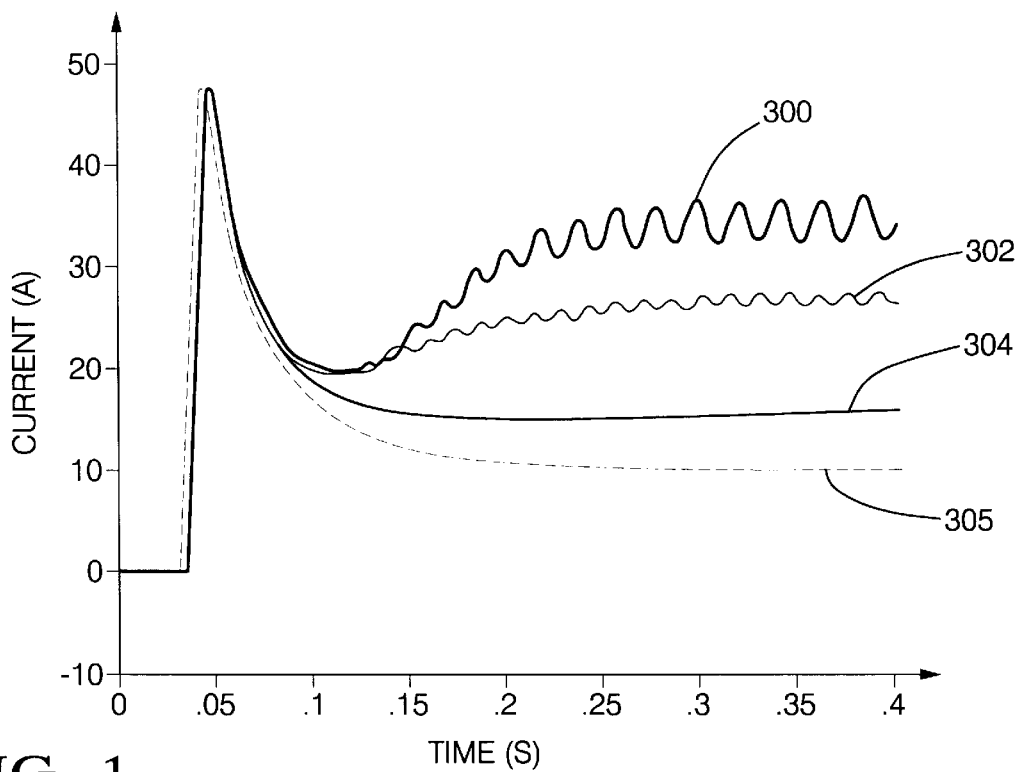
FIG. 1 illustrates example electric currents of an ABS pump motor during initial activation.

Referring now to FIG. 1, the graph illustrates four motor current profiles corresponding to the current (filtered) through an ABS pump motor immediately following activation of the motor. Traces 300, 302, 304 and 305 illustrate current profiles when the master cylinder pressure to which the pump output is coupled ranges of 3,000 psi (trace 300) to 250 psi (trace 305). As the current profiles illustrate, within about 10 milliseconds of pump activation, the currents represented by traces 300, 302 and 304 peak and after about 90 milliseconds the currents begin separating into three separate bands. Determining the pressure at the output of the pump and therefore the master cylinder pressure may be done on a single pump by monitoring the pump current during the steady state running of the pump, i.e., at least 300 milliseconds after the pump has been activated. However, accuracy will be compromised in different systems because of part-to-part variability in pump electrical and physical tolerances, which will affect the pump current.

Figure 2:
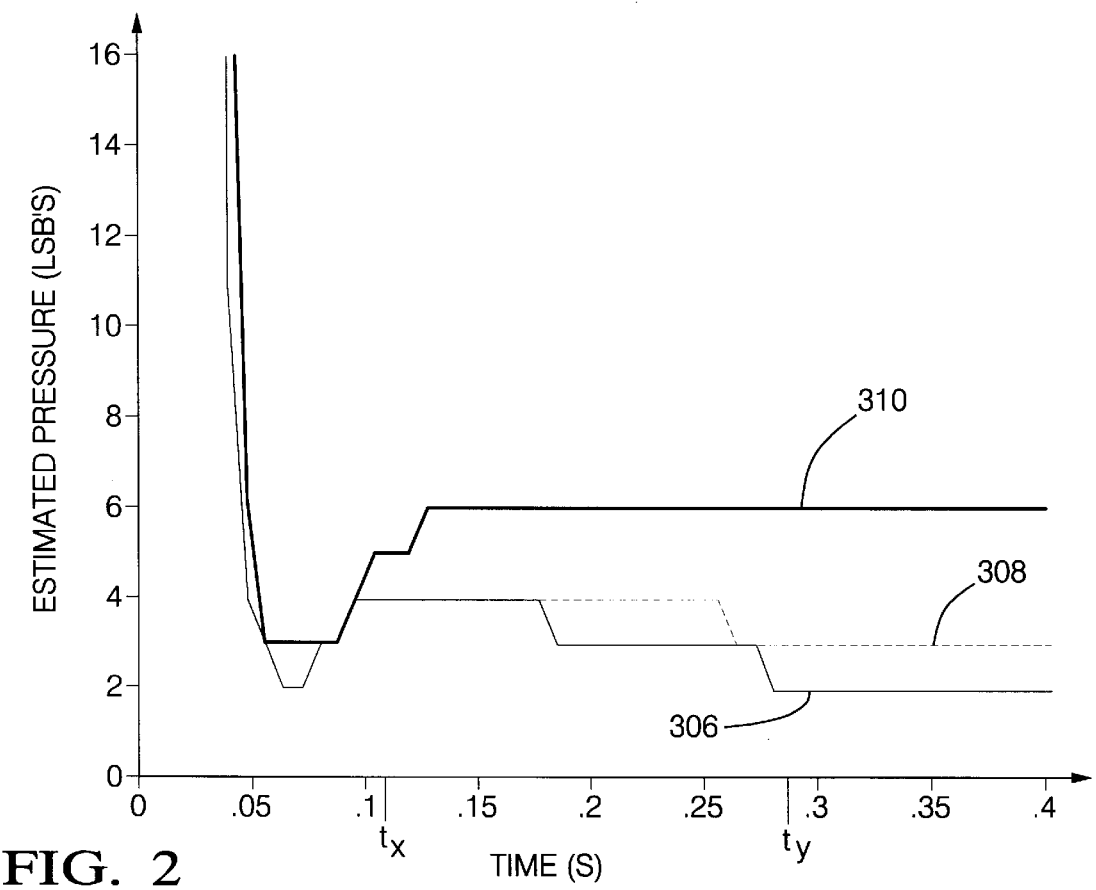
FIG. 2 illustrates example pressure band determinations according to this invention.

Referring now also to FIG. 2, a correlation between pump current ratios and pump output load (and therefore master cylinder pressure) is shown. The traces 306, 308 and 310 illustrate the ratios of the peak pump currents to currents detected after the peak currents for a pump with output pressures of 3,000 psi, 1,500 psi and 250 psi, respectively. As FIG. 2 illustrates, the by time $t_X$, within 90 milliseconds of pump start up, three distinct pressure bands are observable. By the time $t_Y$, 250 milliseconds after pump start-up, four distinct pressure bands are observable. Because the graph in FIG. 2 plots ratios, part to part variability factors that affect pump current are canceled out and the bands delineated by FIG. 2 hold true from part to part.

Figure 3:
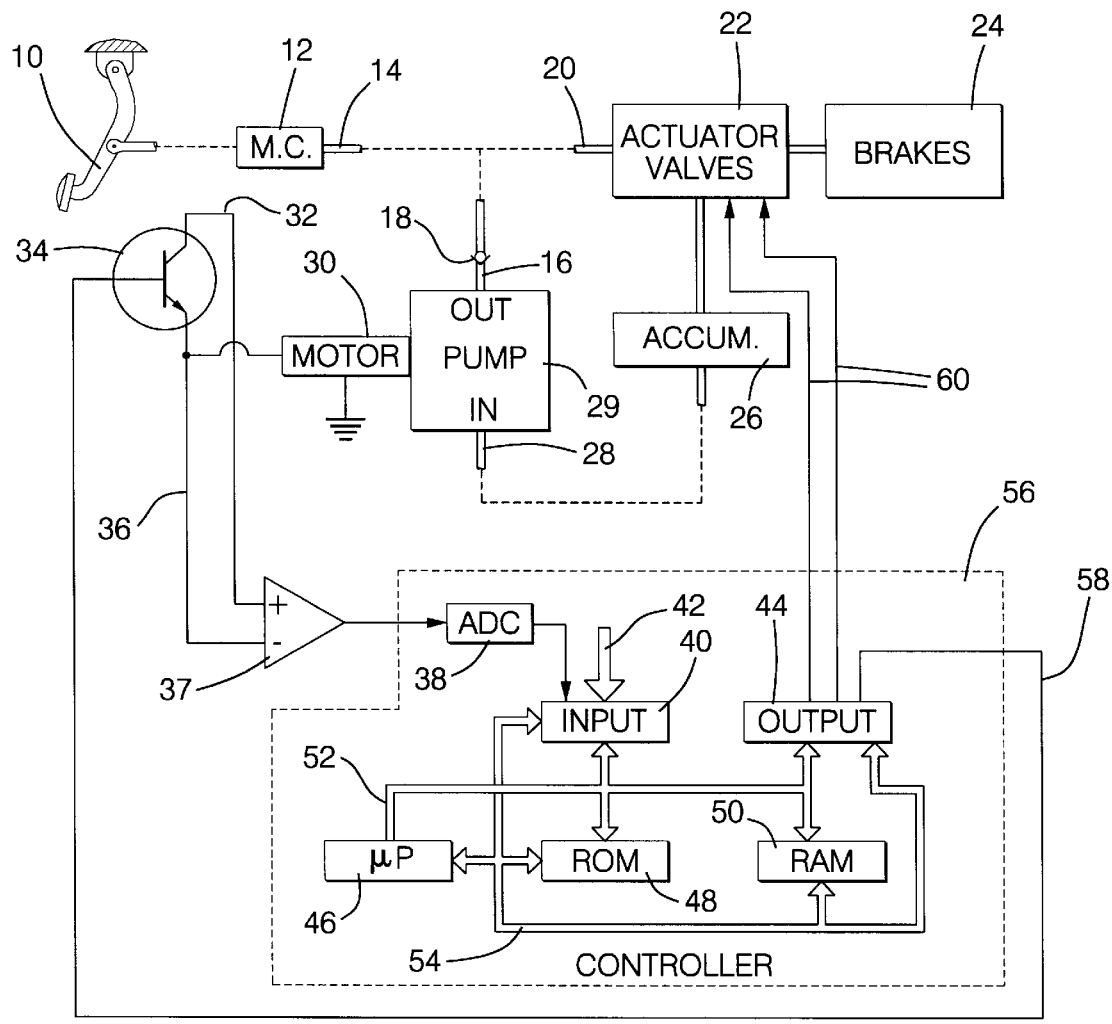
FIG. 3 illustrates a schematic of an example apparatus according to this invention.

Referring now to FIG. 3, the vehicle brake system shown takes advantage of the relationships described above with reference to FIGS. 1 and 2. The vehicle hydraulic brake system shown schematically includes brake pedal 10, master cylinder 12, solenoid actuator valves represented by block 22, the vehicle brakes represented by block 24, an accumulator represented by block 26 and hydraulic pump 29, which receives its motive force from electric motor 30.

During normal braking operation, when the vehicle operator depresses brake pedal 10, the master cylinder 12 responds by increasing the hydraulic pressure in hydraulic lines 14, which are coupled to hydraulic lines 20 connected to the actuator valves 22. The actuator valves 22 are normally open and during normal non-ABS braking, hydraulic pressure from the master cylinder is coupled directly through the valves to the vehicle brakes 24.

The electronic controller 56 monitors a variety of vehicle data through input BUS 42, including wheel speed information from a plurality of wheel speed sensors of a known type (not shown) that provide output signals indicative of the rotational velocity of the individual wheels. When the controller 56, in response to the information on BUS 42, determines an incipient wheel lock up condition of one or more of the vehicle wheels, the controller provides an output command through line 58 to transistor 34, turning on transistor 34, which then provides current to electric motor 30. The electric motor 30 then immediately begins operating hydraulic pump 29.

In response to the control commands on lines 60, the actuator valves 22 selectively release hydraulic pressure from the brakes 24 corresponding to the wheels for which an incipient lock-up condition is detected into the accumulator 26, which stores the hydraulic fluid until it is pumped through pump 29 via the pump's input hydraulic line 28. In a known manner, the actuator valves 22 selectively apply hydraulic pressure, pumped from accumulator 26, through pump 29, past check valve 18, into the hydraulic circuit leading to hydraulic line 20 at the input to the actuator valves 22, to the brakes 24. By responding to the data on BUS 42 to selectively provide the control signals on lines 60, controller 56 controls the actuator valves 22 to achieve the controlled release and apply of hydraulic fluid to the vehicle brakes 24 as desired during anti-lock brake operation. Except for the modifications disclosed herein, anti-lock brake control of the type used with the apparatus shown in FIG. 1 is well known to those skilled in the art and the details of the well known portions of the control need not be repeated herein.

Lines 32 and 36 connect the high and low voltage sides of transistor 34 to the inputs of differential amplifier 37, which provides an output signal indicative of the voltage across transistor 34. The voltage across transistor 34 varies with the current used by motor 30 and transistor 34 is thus used as a current sensing device in the circuit of the electric motor 30. Analog-to-digital converter 38 converts the signal output from amplifier 37 into a digital format and provides that signal to the input circuit 40 for use within the electronic controller 56.

In addition to the input circuitry 40, the electronic controller 56 includes a microprocessor 46, ROM 48, RAM 50, output interface circuitry 44 and command and data buses 52 and 54. All of the components of the controller 56 are of a type well known to those skilled in the art. In general, microprocessor 46 performs a series of commands stored in permanent memory 48 to receive the input data through input interface circuitry 40 and perform the control steps described herein along with known anti-lock brake control steps and provide the control commands for actuator valves 22 to the output interface circuitry 44.

Immediately after detection of an incipient wheel lock-up condition of one or more of the vehicle wheels, the controller 56 outputs a signal through line 58 to the transistor 34, turning on the transistor 34, in turn turning on the motor 30 and starting pump 29. After start-up of the motor, the microprocessor 46 continually samples and low pass filters the signal output from analog to digital converter 38. After expiration of a first time period $t_1$ (i.e., $t_1$=0.010 seconds) after start-up of the motor 30, the microprocessor 46 stores a first sample of the low pass filtered signal as a representation of current through motor 30 at time $t_1$. In general, the period $t_1$ is set to capture an approximate peak of the current through motor 30. After expiration of a second time period $t_2$ (i.e., $t_2$=0.090 seconds) after start-up of the motor 30, the microprocessor 46 stores a second sample of the low pass filtered signal as a representation of current through motor 30 at time $t_2$. Microprocessor 46 processes those two sampled signals, determines an indication of the hydraulic pressure within the master cylinder 12 based on those two sampled signals and uses that information in determining commands for actuator valves 22 to perform the anti-lock brake control of the wheel brakes 24. According to the example described herein, the initial pressure of master cylinder 12 at the activation of the anti-lock braking control can be determined in one of three pressure bands within about 100 milliseconds of the activation of the pump motor 30. If desired, the voltage across transistor 34 can be continuously monitored and thereafter used to obtain increased resolution of master cylinder pressure as the pump motor continues to run.

Figure 4:
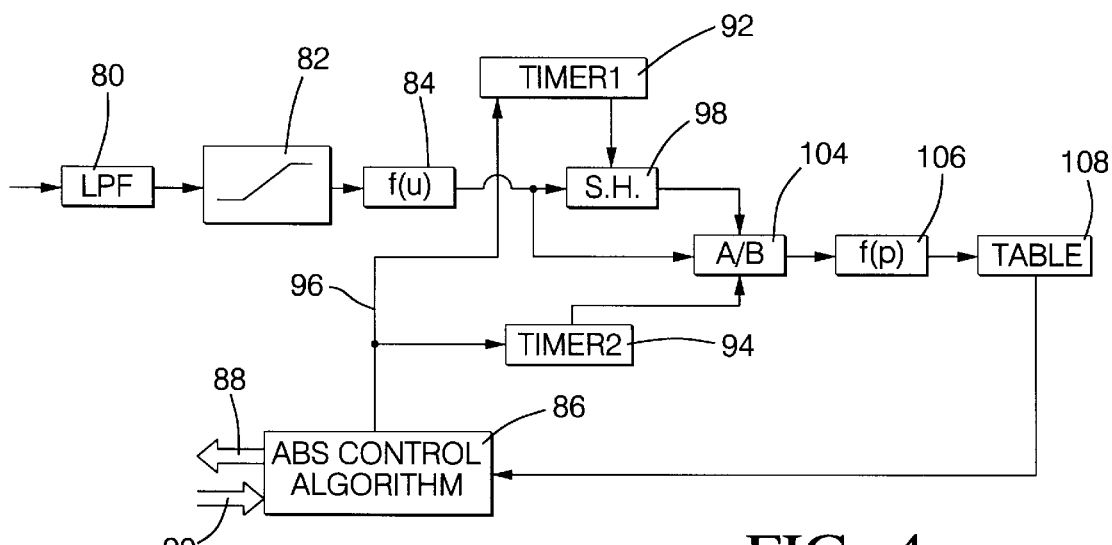
FIG. 4 illustrates a schematic of an example control for use with this invention.

Referring now to FIG. 4, the schematic shown illustrates the initial master cylinder pressure estimation according to this invention. The data input, for example, as provided by the analog-to-digital converter 38 (FIG. 3), is low pass filtered by filter 80 and then provided to a saturation function block 82, which limits the filter output to predetermined maximum and minimum values bounding the expected operating range of the data received by the controller 56 and filtered by filter 80. The predetermined maximum and minimum values can be easily determined by one skilled in the art by monitoring the current output of the motor in a test vehicle during example braking conditions and setting the maximum and minimum values at the maximum and minimum current values observed in a normally operating system.

Block 84 represents a generic function block that may be implemented to scale the output of block 82 or provide a nonlinear function thereto, if desired, to transform the information from block 82 to a scale or other form of a type more desirable to the system designer. The output of block 84 is provided to sample and hold block 98 and to block 104 which are enabled by timers 92 and 94, respectively. Timers 92 and 94 in turn are initiated by the signal on line 96 provided by the ABS control algorithm 86 when an incipient wheel lock-up condition triggering an ABS control event is first detected.

With the initiation signal on line 96, the timers 92 and 94 begin running. Timer 92 times out first (for example after 0.010 seconds) and provides a signal to sample and hold block 98, commanding the sample and hold function to sample the output of block 84 and hold that sampled signal as an input to block 104. In this manner, block 98 traps the approximate peak motor current. A short time later, timer 94 times out (for example, after 0.090 seconds), enabling block 104 to continuously sample the output of block 84 and provide at its output a ratio of the data captured by sample and hold block 98 and output by block 84.

The output of block 104 is provided to block 106, which is a generic, nonlinear function block that may be implemented to convert the ratio output from block 104 to a more desirable scale or format for use as an indication of pressure in the master cylinder at the initiation of the ABS routine. The signal output from block 106 is input to table 108, which provides an output signal indicative of one of three or more predetermined pressure bands in which the master cylinder pressure may fall. The use of pressure bands is preferred where there are resolution limitations of the pressure signal provided by block 106. The pressure band selected by table 108 is the initial master cylinder pressure estimation that is then provided to the ABS control algorithm 86, which utilizes the initial master cylinder pressure information to control the ABS operation through the solenoid actuator valves 22 (FIG. 3).

As the motor continues to run, the pressure estimation may be continuously updated and table 108 may vary as a function of time, for example, dividing into four pressure bands after 250 milliseconds of pump operation, to increase resolution.

It is noted that the master cylinder pressure determined as described herein may be used in any manner desired by a system designer to facilitate or enhance the control provided by the ABS control algorithm 86, many examples of which are known to those skilled in the art, and no specific implementation of the ABS control algorithm 86 is required by this invention.

Figure 5:
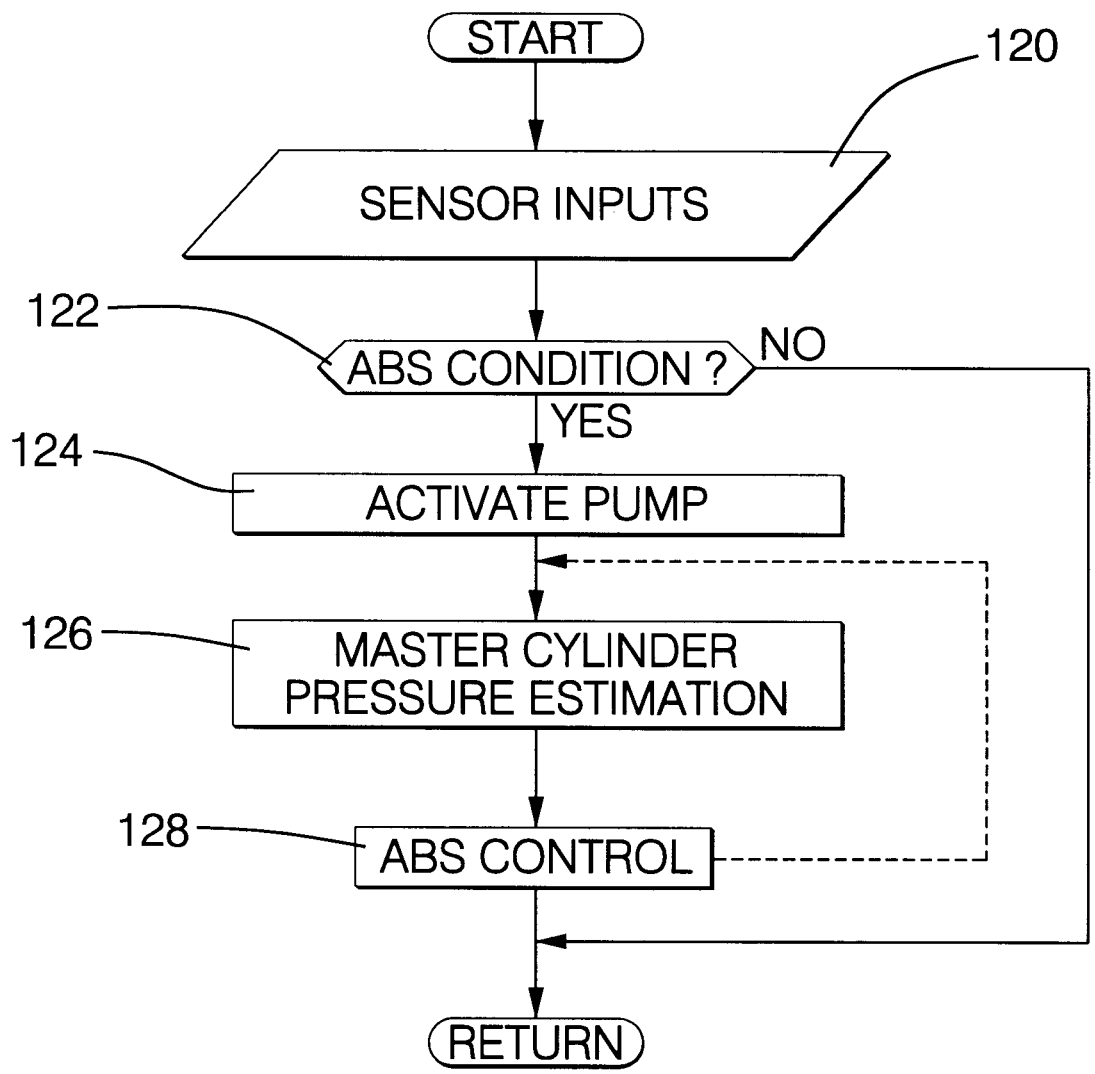
FIGS. 5 and 6 illustrate command flow diagrams of an example control according to this invention.

Referring now to FIG. 5, an example master flow control diagram for controller 56 (FIG. 3) is shown. The controller continuously monitors the various sensor inputs at block 120 and determines in a known manner at block 122 whether or not an incipient wheel lock-up condition warranting initiation of ABS control exists. If an ABS control is initiated, block 124 activates the motor for the hydraulic pump and block 126 performs the master cylinder pressure estimation according to the examples set forth herein. Block 128 then performs the ABS control functions utilizing the master cylinder pressure information estimated at block 126.

Figure 6:
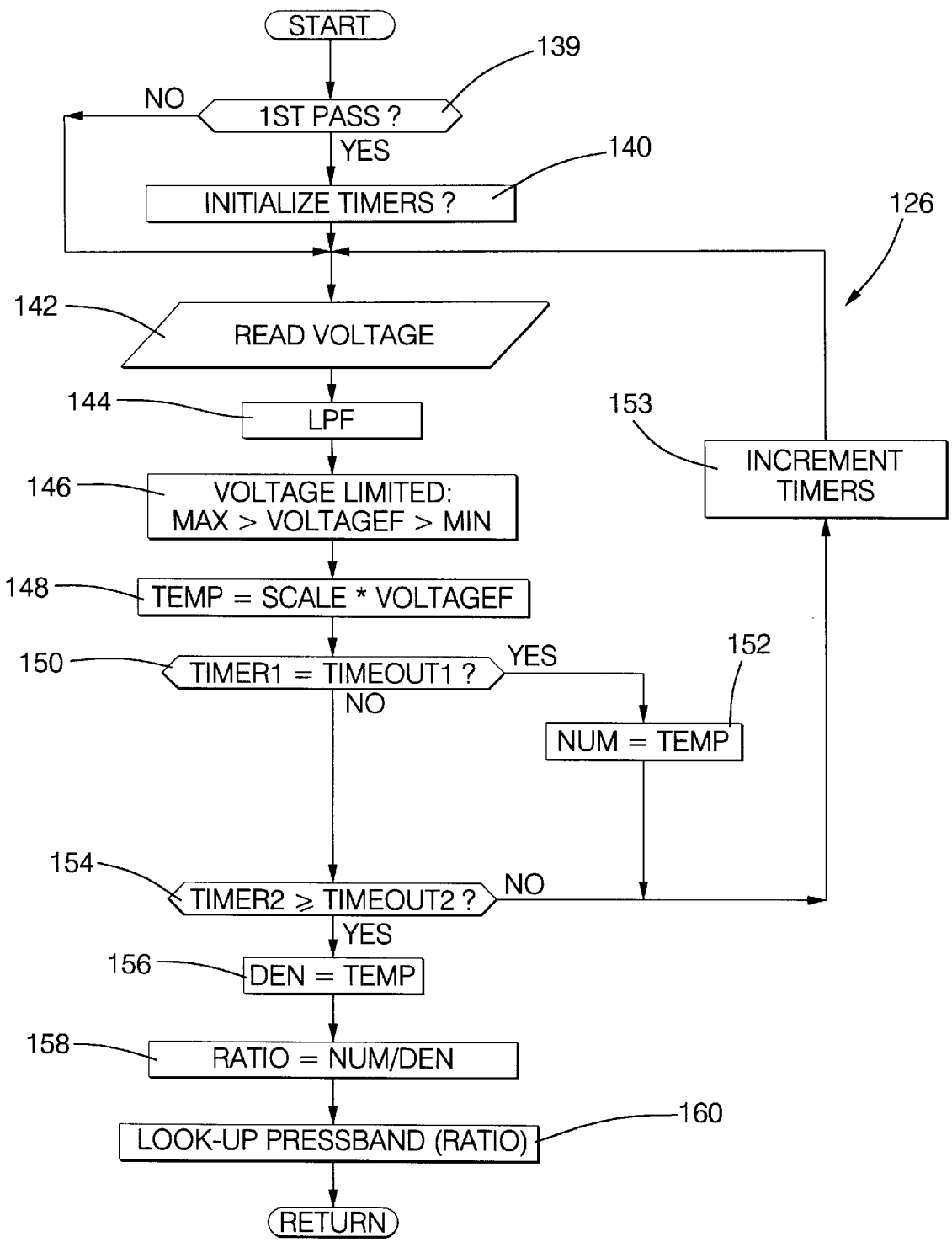

Referring now to FIG. 6, an example of the steps performed at block 126 is shown. At block 139, the routine determines if the control loop is in its first pass since activation of ABS. If so, the routine continues to block 140, otherwise the routine continues to block 142. At block 140, two timers, TIMER1 and TIMER2, are initialized and then the routine moves to block 142 where it reads the voltage level across the pump motor drive transistor 34 (FIG. 3), as provided at the output of analog-to-digital converter 38 (FIG. 3). The voltage input at block 142 is low pass filtered at block 144 through a known digital single pole low pass filter with a cut-off frequency at about 1 kHz and provides an output signal VOLTAGEF. Then block 146 limits VOLTAGEF so that it is no greater than the values MAX and MIN, where MAX and MIN are predetermined values that bound the expected range of the signal VOLTAGEF.

The output of block 146 is provided to block 148 where a temporary value, TEMP, is determined as:

$$\text{TEMP} = \text{SCALE} * \text{VOLTAGEF},$$

where SCALE is a scale value that converts the signal VOLTAGEF to a range more desirable for use by the system. Then block 150 compares the value TIMER1 to its time-out value (i.e., 0.010 seconds) and if TIMER1 is not equal to its time-out value, then the routine continues to block 154. If TIMER1 is equal to its time-out value, the routine continues to block 152 where it sets the value NUM equal to TEMP. The routine then moves to block 153 where TIMER1 and TIMER2 are both incremented and then returns to block 142.

At block 154, TIMER2 is compared to its time-out value (i.e., 0.090 seconds). If TIMER2 is not greater than or equal to its time-out value, the routine continues to block 153. If TIMER2 is greater than or equal to its time-out value, the routine continues to block 156 where the value DEN is set equal to TEMP. From block 156 the routine continues to block 158 where it determines:

$$\text{RATIO} = \text{NUM}/\text{DEN}.$$

From block 158, the routine continues to block 160 where it determines the pressure band from a look-up table as a function of RATIO. In one example, the entire master cylinder operating pressure range is divided into at least three pressure bands and the pressure band determined at block 160 designates one of the at least three pressure bands within approximately 0.100 seconds of motor start-up.

It may be desirable to add a temperature compensation to the system shown in FIG. 2 if it is found that the pressure estimation described herein is affected by temperature. A variety of means for implementing temperature compensation are available to those skilled in the art. For example, a thermistor can be placed in series with transistor 34 to oppose the changes in the impedance of transistor 34 as the temperature of transistor 34 changes.

We claim:

1. In a control apparatus for a fluid brake system including a hydraulically activated wheel brake, a master cylinder containing a hydraulic fluid having a hydraulic pressure, a hydraulic pump having an output hydraulically coupled to the master cylinder, an electric motor coupled to and providing motive force to the hydraulic pump, and a current sensing device coupled to the electric motor and providing an output signal indicative of electric current through the electric motor, the control apparatus being responsive to an estimated master cylinder hydraulic pressure derived from the output signal of the current sensing device to control the application of hydraulic fluid from the master cylinder to the wheel brake, the improvement comprising:

means for sampling and storing an initial peak value of the value of the output signal of the current sensing device at a first time after initiation of operation of the electric motor;

means for sampling and storing a second value of the output signal of the current sensing device at a second time after the initiation of operation of the electric motor, the second time being later than the first time and later than a predetermined reference time;

means for determining the ratio of the stored second value to the stored first value; and means for deriving the estimated master cylinder hydraulic pressure from the determined ratio, whereby the initial peak value of the output signal of the current sensing device compensates the estimated master cylinder hydraulic pressure for environmental and apparatus variations that affect the relationship between the electric current through the motor and the hydraulic pressure of the hydraulic fluid provided by the hydraulic pump.

2. The improvement of claim 1 wherein the second time occurs less than 100 milliseconds after initiation of operation of the electric motor.

3. The improvement of claim 1 wherein the first time is in the range 5 to 20 milliseconds after initiation of operation of the electric motor.

4. The improvement of claim 3 wherein the second time is within the range 60 to 150 milliseconds after initiation of operation of the electric motor.

5. A method of deriving an early estimated master cylinder hydraulic pressure band in a control apparatus for a fluid brake system including a hydraulically activated wheel brake, a master cylinder containing a hydraulic fluid having a hydraulic pressure, a hydraulic pump having an output hydraulically coupled to the master cylinder, an electric motor coupled to and providing motive force to the hydraulic pump, and a current sensing device coupled to the electric motor and providing an output signal indicative of electric current through the electric motor, the control apparatus being responsive to the derived early estimated master cylinder hydraulic pressure band to control the application of hydraulic fluid from the master cylinder to the wheel brake, the method comprising the steps:

sampling the output signal of the current sensing device;

storing an initial peak value of the sampled output signal of the current sensing device at a first time after initiation of operation of the electric motor;

storing a second value of the output signal of the current sensing device at a second time after the initiation of operation of the electric motor, the second time being predetermined to be just as the output signal first begins to distinguish different values of master cylinder pressure;

determining the ratio of the stored second value to the stored first value;

storing data defining a plurality of predetermined pressure bands; and choosing one of the predetermined pressure bands from the stored table corresponding to the determined ratio of the stored second value to the stored first value, whereby an early estimated master cylinder hydraulic pressure band, compensated for environmental and apparatus variations that affect the relationship between the electric current through the motor and the hydraulic pressure of the hydraulic fluid provided by the hydraulic pump, is obtained before the relationship stabilizes.

6. The improvement of claim 5 wherein the second time occurs less than 100 milliseconds after initiation of operation of the electric motor.

7. The improvement of claim 5 wherein the first time is in the range 5 to 20 milliseconds after initiation of operation of the electric motor.

8. The improvement of claim 7 wherein the second time is within the range 60 to 150 milliseconds after initiation of operation of the electric motor.

* * * * *